United States Patent
Williams et al.

(10) Patent No.: US 8,544,877 B2
(45) Date of Patent: Oct. 1, 2013

(54) SLOPED FACED AIRBAG CUSHIONS FOR MITIGATING NECK INJURY

(75) Inventors: Jeffrey D. Williams, Roy, UT (US); Patrick Dee Jamison, North Ogden, UT (US); Akihiro Yamada, Kasumigaura (JP)

(73) Assignee: Autoliv ASP, Inc., Ogden, UT (US)

( * ) Notice: Subject to any disclaimer, the term of this patent is extended or adjusted under 35 U.S.C. 154(b) by 200 days.

(21) Appl. No.: 12/982,535

(22) Filed: Dec. 30, 2010

(65) Prior Publication Data

US 2012/0169031 A1 Jul. 5, 2012

(51) Int. Cl.
*B60R 21/16* (2006.01)

(52) U.S. Cl.
USPC ............... 280/730.1; 280/731; 280/743.1

(58) Field of Classification Search
USPC .............................. 280/743.1, 731
See application file for complete search history.

(56) References Cited

U.S. PATENT DOCUMENTS

| | | | |
|---|---|---|---|
| 5,184,844 A | 2/1993 | Goor | |
| 6,513,829 B1 | 2/2003 | Zumpano | |
| 6,659,505 B1 | 12/2003 | Knox | |
| 7,137,472 B2 | 11/2006 | Aoki | |
| 7,153,524 B2 | 12/2006 | Yoshihara et al. | |
| 7,695,002 B2 | 4/2010 | Choi | |
| 7,708,311 B2 * | 5/2010 | Bito | 280/732 |
| 7,934,747 B2 * | 5/2011 | Miyata | 280/729 |
| 7,953,532 B2 | 5/2011 | Odate et al. | |
| 8,256,798 B2 * | 9/2012 | Yamazaki | 280/743.1 |
| 8,282,129 B2 * | 10/2012 | Choi | 280/743.1 |
| 8,308,187 B2 * | 11/2012 | Miyata | 280/729 |
| 2004/0020701 A1 | 2/2004 | Aoki | |
| 2005/0206151 A1 | 9/2005 | Ashline | |
| 2006/0202454 A1 | 9/2006 | Parizal et al. | |
| 2008/0054617 A1 | 3/2008 | Schwant | |
| 2009/0058056 A1 * | 3/2009 | Yamada | 280/732 |
| 2010/0025976 A1 | 2/2010 | Murtha et al. | |
| 2010/0156077 A1 | 6/2010 | Miyata | |
| 2012/0169033 A1 | 7/2012 | Heasman et al. | |

OTHER PUBLICATIONS

Office Action mailed Dec. 6, 2012 in co-pending U.S. Appl. No. 12/982,553.
Amendment and Response to Office Action filed Apr. 1, 2013 in co-pending U.S. Appl. No. 12/982,553.

* cited by examiner

*Primary Examiner* — Toan To
(74) *Attorney, Agent, or Firm* — Stoel Rives LLP

(57) ABSTRACT

Airbag cushions are provided that mitigate the potential for injury to an occupant's neck via a sloped face, a particular cushion height, and/or a relatively flat top portion. These airbag cushions can be used with seat belt systems that moderates the seat belt loads acting on the occupant to allow an improved synchronization of the occupant torso and head rebound timing, which in turn limits head and torso differential loading (frontal whiplash) and therefore occupant neck loads and neck, based on the position of the occupant, loads on the seatbelt, or a predetermined time in the crash event.

21 Claims, 18 Drawing Sheets

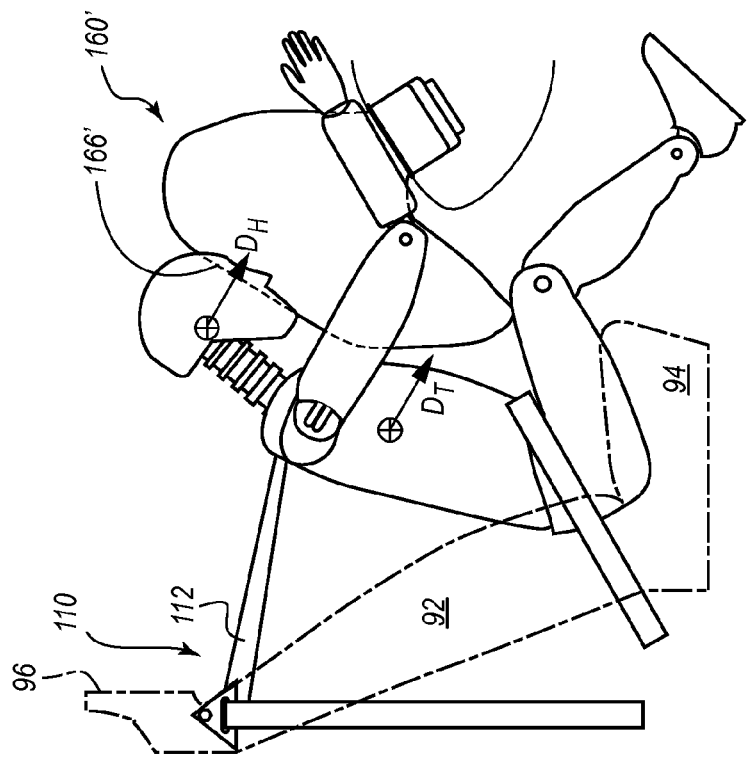
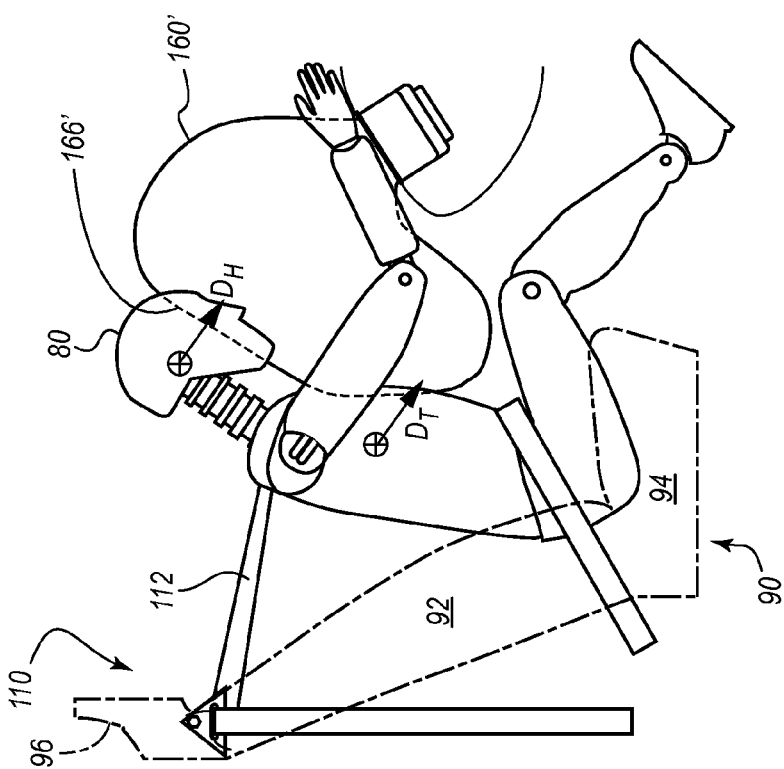

SLOPED FACED AIRBAG CUSHIONS FOR MITIGATING NECK INJURY

TECHNICAL FIELD

The present disclosure relates generally to the field of automotive safety systems. More specifically, the present disclosure relates to inflatable airbag cushions and also to their use with seatbelt restraint systems.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 11A is a side view of an occupant during ride down induced loading, a seat belt system and the airbag shown in FIG. 10.

FIG. 11B is a side view of an occupant after arrest and transition induced loading, a seat belt system and the airbag shown in FIG. 10.

DETAILED DESCRIPTION OF PREFERRED EMBODIMENTS

Figure 1A:
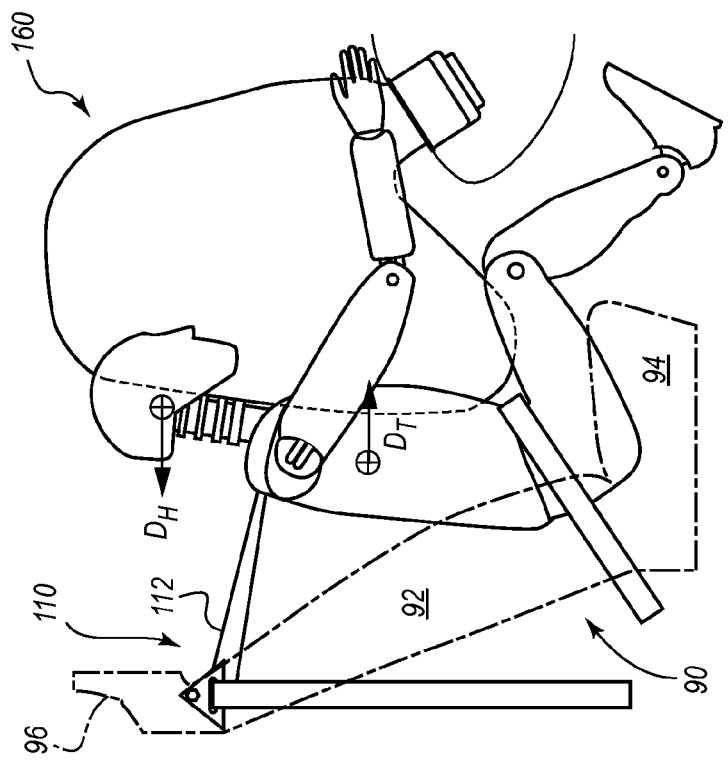
FIG. 1A is a side view of an occupant and a seat belt system during retractor pretensioner loading phase or phase 1.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in this packaged configuration behind a cover. During a collision event, vehicle sensors trigger the activation of an inflator, which rapidly fills the airbag with inflation gas. Thus the airbag rapidly changes configurations from the packaged configuration to an expanded configuration.

The systems, methods and airbags disclosed herein enable an occupant of a vehicle to have a reduced risk of injury in the event of a crash. The systems and methods use a seat belt system, which has multiple functions. One function of the seat belt system is to be activated before the airbag is activated so that the seat belt system provides pretensioning to the seatbelt. Another function of the seatbelt system is to be activated, after deployment of an airbag, to moderate the restraint loads upon an occupant at the critical time as the occupant transitions into rebound. Moderation of belt loads as an occupant transitions into rebound enables an improved synchronization of the occupant torso and head rebound timing which in turn limits head and torso differential loading (frontal whiplash) and therefore occupant neck loads and neck injuries. The moderation of belt loads applied to the occupant is initiated based on the design of the particular system. For example, the moderation of the belt loads may be initiated or prompted based on the position or location of the occupant, based on a designated time after an impact is sensed or other triggers that are relative to reducing the occupant's velocity relative to the velocity of the vehicle. Factors that affect these triggers include the crash severity, the size of the occupant, the speed of the vehicle, etc. Such factors would cause the timing of the initiation of the moderation of the belt load to vary.

FIGS. 1A-1E illustrate one embodiment during a collision taken at five different moments to show five distinct phases of the location of the occupant 80 or crash dummy 80, particularly the neck behavior, as the occupant interacts with the seatbelt system 110 and airbag 160. In addition to airbag 160, other airbags are disclosed herein that can be used in conjunction with the methods and systems.

FIG. 1A shows the retractor pretensioner loading phase. This phase occurs at a moment after an impact has been sensed up to about 40 milliseconds after sensing the impact. As shown by direction arrow, $D_S$, retracting the seatbelt 112 through the action of pretensioning causes the occupant's torso to be pulled back, as shown by direction arrow, $D_T$, toward backrest 92. More specifically, the occupant has been pulled by seatbelt 112 such that the occupant's torso is against backrest 92 and the occupant's hips are against the lower portion of backrest 92 where backrest 92 joins base 94. The occupant is pulled in FIG. 1A due to the action of a seatbelt retractor pretensioner (not shown), which is in its loading phase. Such a pretensioner may, for example, be driven by a microgas generator. As the occupant's torso is moved firmly back into the seat, as shown in FIG. 1A, the occupant's head moves in the opposite direction and the occupant's neck is placed in negative shear.

Figure 1B:
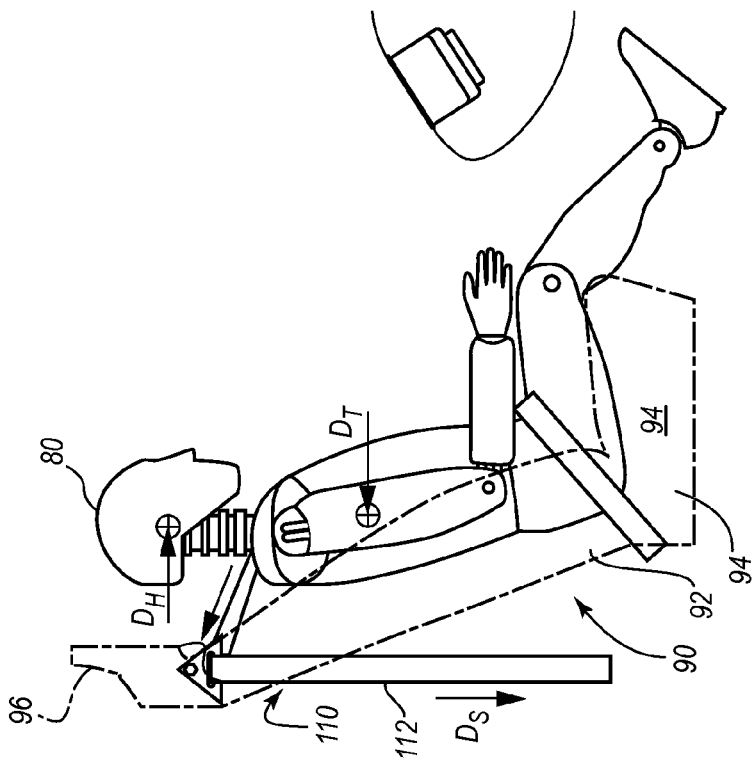
FIG. 1B is a side view of an occupant, a seat belt system and an airbag during ride down induced loading or phase 2.

FIG. 1B shows an occupant during ride down induced loading. This phase occurs after airbag 160 has deployed. At this point the occupant and restraint system are experiencing the vehicle's deceleration pulse. As the occupant rides down into the restraint system, airbag vents and seat belt load limiter (not shown), such as a fold sewn into the belt webbing, or an energy management mechanism contained in the seatbelt retractor, operate to moderate the loads applied to the occupant when a certain amount of force is applied to belt 112. This permits the occupant's torso, as shown by direction arrow, $D_T$, to move away from backrest 92. As a result of the torso penetrating the airbag 160, the cushion becomes stiff and the occupant's head is moved backward toward backrest 92, as shown by direction arrow, $D_H$. The rearward movement of the occupant's head results in less penetration of airbag 160 by occupant's head as compared with occupant's torso and the neck is placed in positive shear.

Figure 1C:
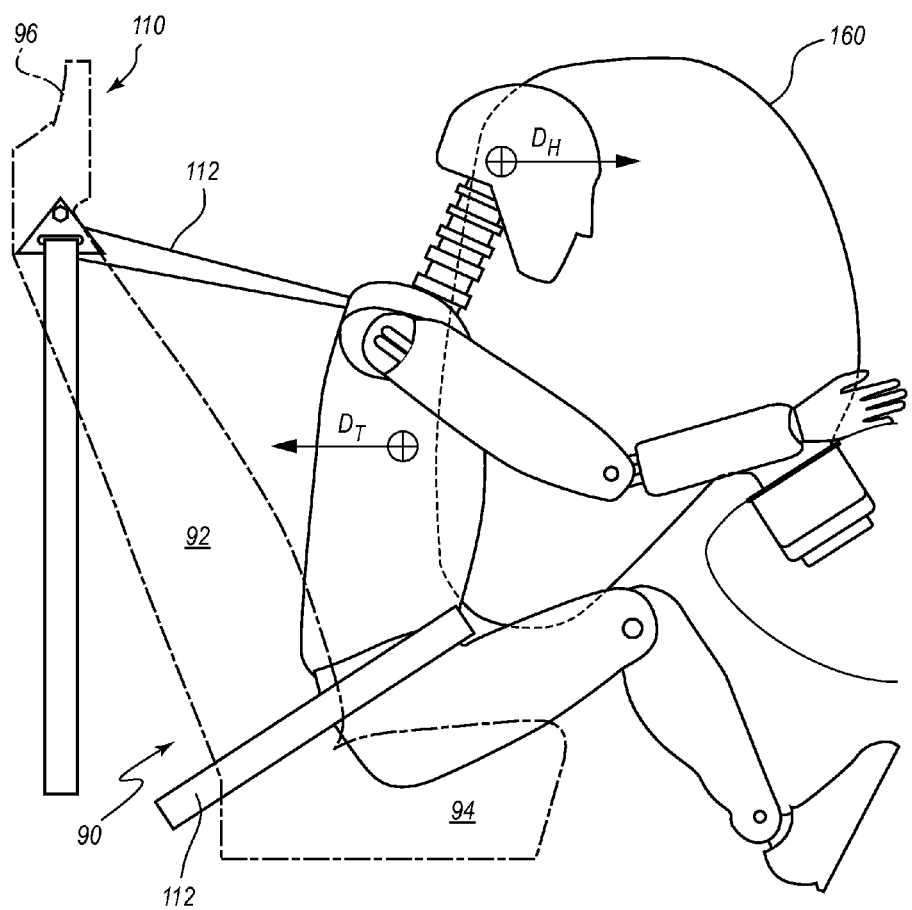
FIG. 1C is a side view of an occupant, a seat belt system and an airbag during arrest and transition induced loading or phase 3.

FIG. 1C shows an occupant during arrest and transition induced loading. In this third phase, seatbelt 112 has been stretched to its limit and due to the stored elastic energy in the seatbelt webbing is ready to propel the occupant rearward in vehicle. More particularly, the torso reaches a fully arrested state before the head and rebounds back toward the backrest 92, as shown by direction arrow, $D_T$, while the head continues to move forward, as shown by direction arrow, $D_H$, and is still penetrating airbag 160. However, the severity of this transition loading on the neck is diminished by moderating the seatbelt restraint loads upon the occupant at the point at which the torso reaches a point of maximum forward displacement. Moderating belt loads at this critical time enables an improved synchronization of the occupant torso and head rebound timing by reducing the severity with which the torso enters rebound. This in turn limits head and torso differential loading (frontal whiplash) and therefore occupant neck loads and neck injuries. Because the transition induced loading is less severe than the loading would be without moderating belt loads, the occupant's head is not rapidly recoiled in a rearward direction and the occupant's head and torso can continue to ride down smoothly into the airbag 160 and then enter rebound in a synchronized manner, which significantly decreases the possibility for injury to an occupant's neck.

The moderation of belt loads may occur approximately when the occupant's torso reaches an arrested state and is poised to transition from forward movement to rearward movement. Stated otherwise, the moderation of the belt loads may occur approximately with the moment when the webbing of the seatbelt system has been stretched to its limit and is ready to propel the occupant rearward in the vehicle after maximum forward displacement and full arrest of the occupant has occurred. As indicated above, this occurs towards the end of the crash pulse or crash event.

In addition to initiation of the moderation of belt loads based on a trigger such as the position of the occupant or conditions of the seatbelt system such as its load or the stretching of the seatbelt, another possible trigger is a designated time. For example, moderating the belt loads may occur at a designated time such as within a range between about 75 milliseconds and about 200 milliseconds or between about 75 milliseconds and about 200 milliseconds after an impact has been sensed. The terms "about" and "approximately" as used to describe this moment during the crash event means twenty milliseconds before or after the arrest of occupant's torso or after the seatbelt has been stretched to its limit. As discussed in more detail below, moderating the belt loads may occur as a distinct transition time such that there is an immediate step down or digression in the amount of force applied to seatbelt 112. Additionally, the load on the seatbelt may be reduced over a short period of time leading up to the point of maximum forward displacement of the occupant. The reduction of the belt load is reduced in direct relation to the occupant velocity relative to the velocity of the vehicle.

Figure 1E:
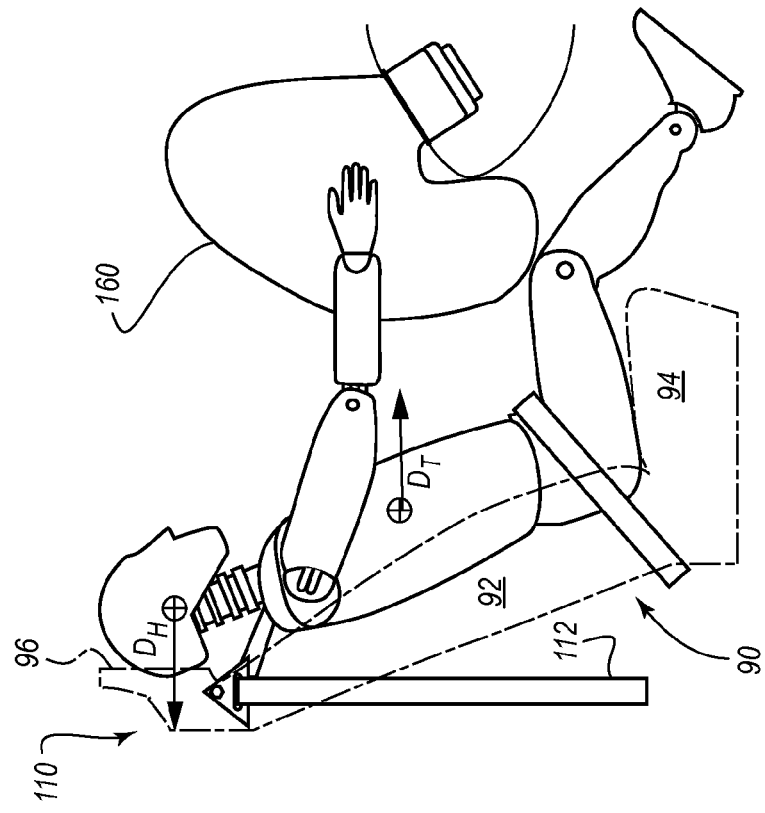
FIG. 1E is a side view of an occupant, a seat belt system and an airbag during rebound impact loading or phase 5.
Figure 1D:
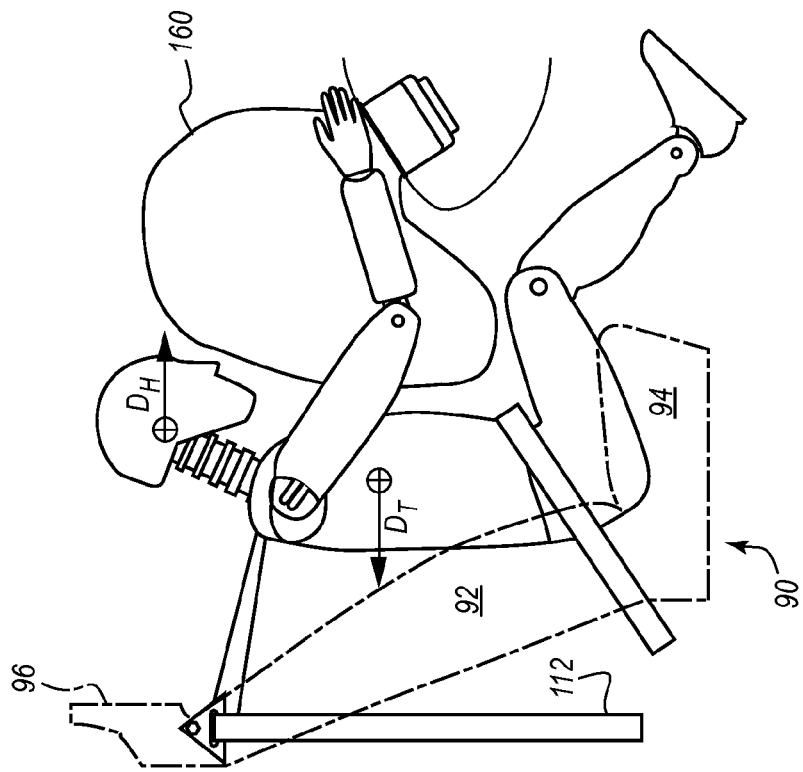
FIG. 1D is a side view of an occupant, a seat belt system and an airbag during rebound induced loading or phase 4.

FIG. 1D shows the movement of the occupant's torso as a result of rebound induced loading. During this phase, the torso continues to be moved toward backrest 92, as shown by direction arrow, $D_T$. More particularly, the torso rebounds, which causes the head to nod forward, as shown by direction arrow $D_H$, as the head follows the torso.

FIG. 1E shows the rebound impact loading. After the occupant impacts backrest 92, the occupant's torso is arrested, while the occupant's head continues to move rearwards. Eventually, the head is arrested against the head restraint 96 of seat 90.

FIGS. 2-5 show four different embodiments of seat belt systems respectively at 210, 310, 410, and 510. These embodiments are designed such that the load on the seatbelt is altered during an impact of the vehicle. As described below, various possible transitions of the load on the seatbelt are described below with respect to the graphs provided in FIGS. 6A-6C.

Figure 2:
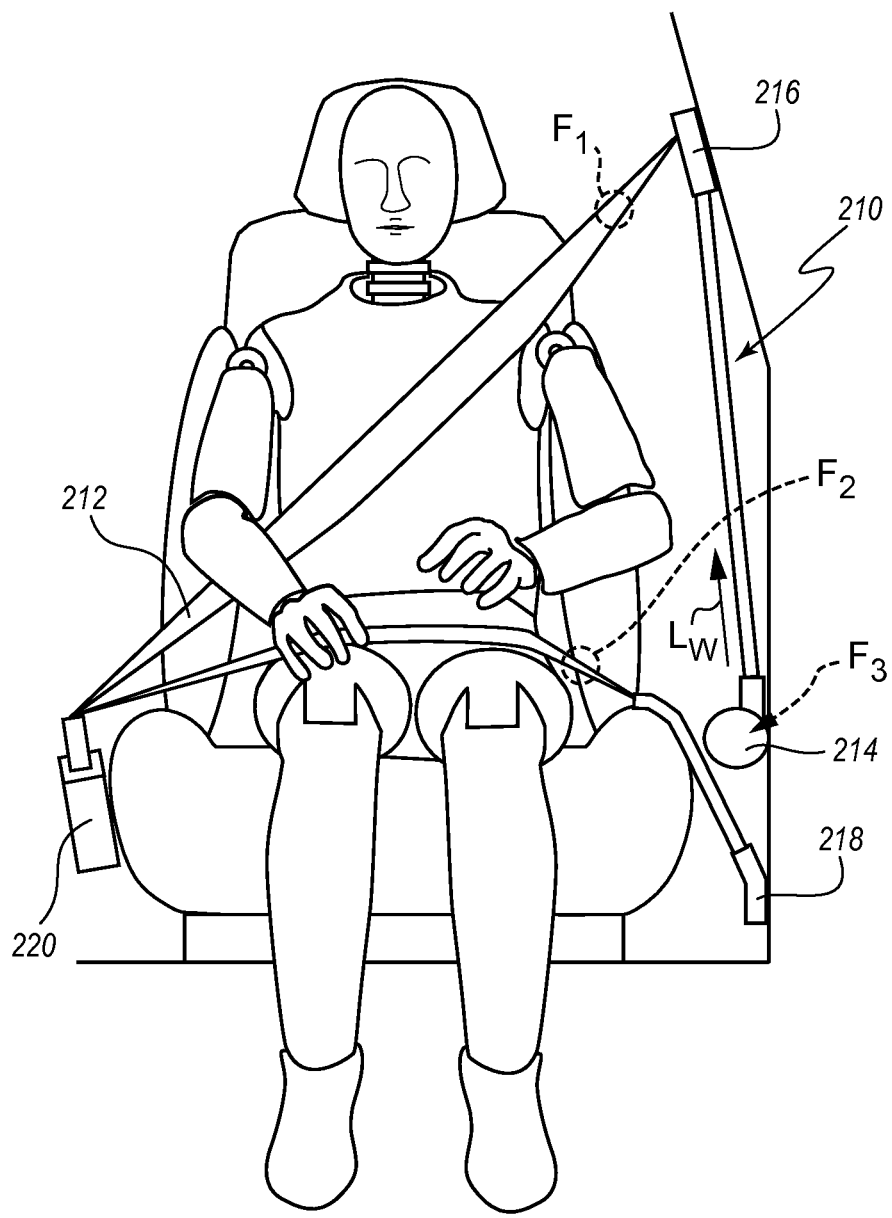
FIG. 2 a front view of an occupant on a seat that shows a seatbelt system.

FIG. 2 shows the length of seatbelt 212 that is extended, or the web payout, to provide for the step down effect $L_W$. In one embodiment, the length, $L_W$, is achieved by a pyrotechnic or a mechanical long digressive/adaptive load limiter switching. In another embodiment, a mechanical system is used to moderate the belt loads in direct relation of the occupant velocity relative to the velocity of the vehicle. For example, retractor system 214, which contains one of these embodiments, may release the length $L_W$.

Figure 3:
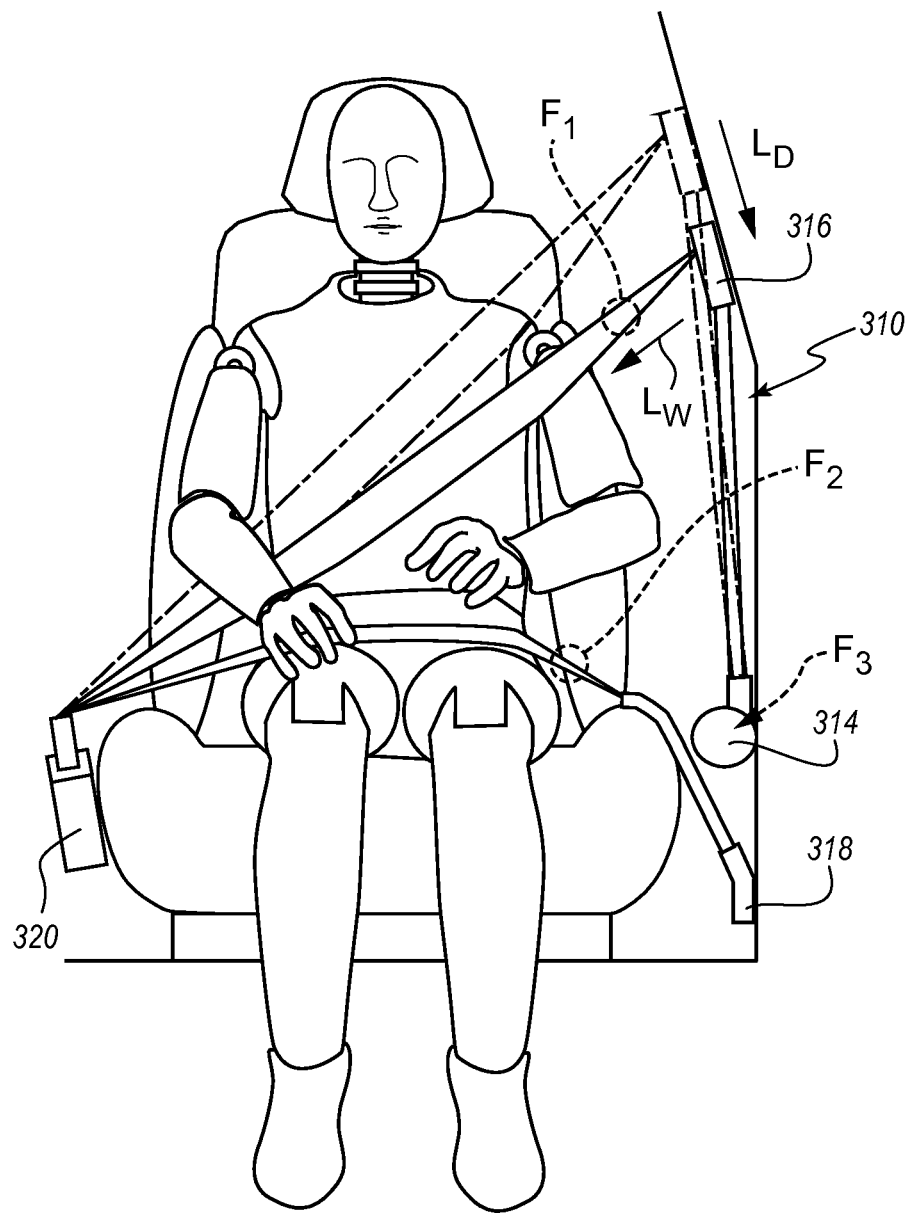
FIG. 3 a front view of an occupant on a seat that shows another seatbelt system.

FIG. 3 show a D-ring 316 that is configured to move a distance identified as $L_D$. When D-ring 316 moves, there is a web payout as identified at $L_W$.

Figure 4:
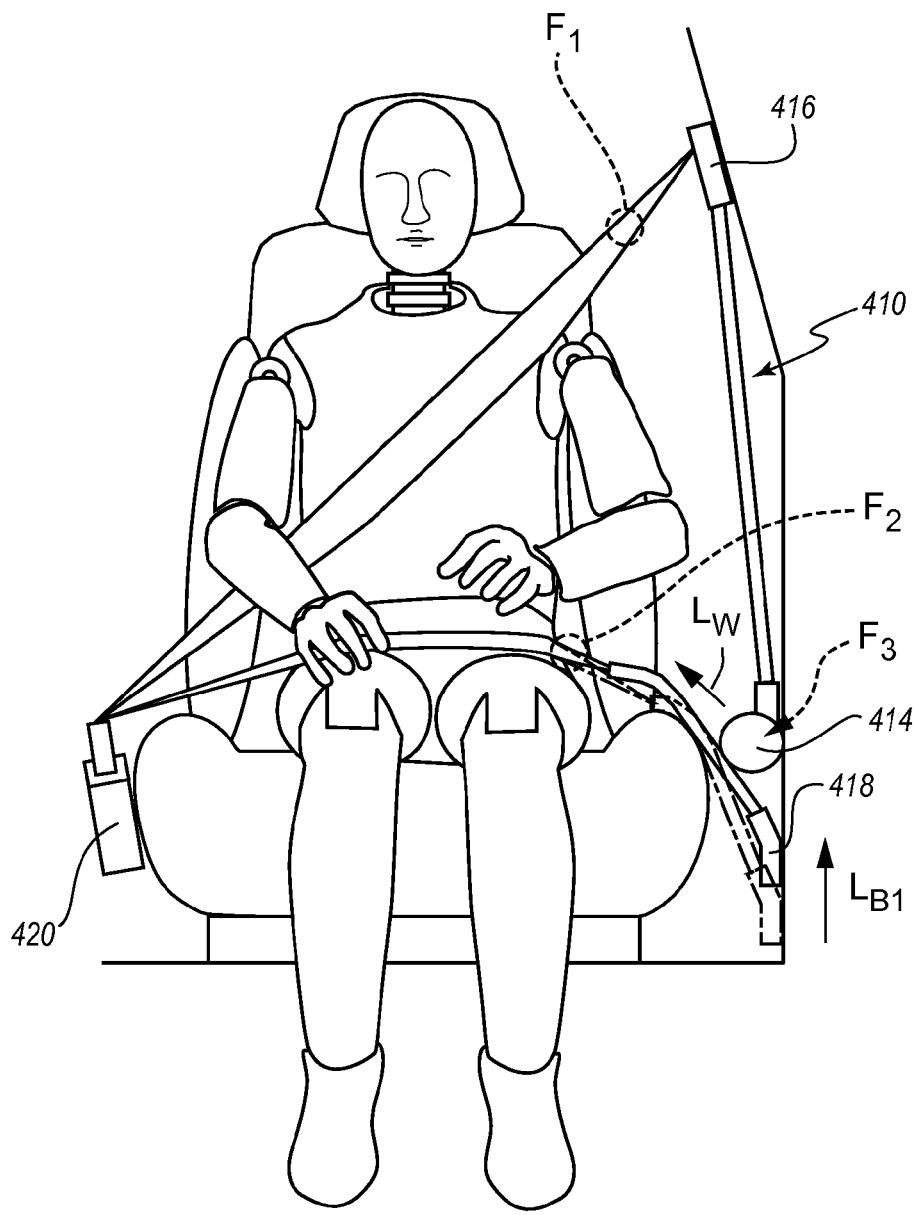
FIG. 4 a front view of an occupant on a seat that shows an additional seatbelt system.

FIG. 4 shows a belt anchor 418 that is configured to move a distance identified as $L_{B1}$. When belt anchor 418 moves, there is a web payout as identified at $L_W$.

Figure 5:
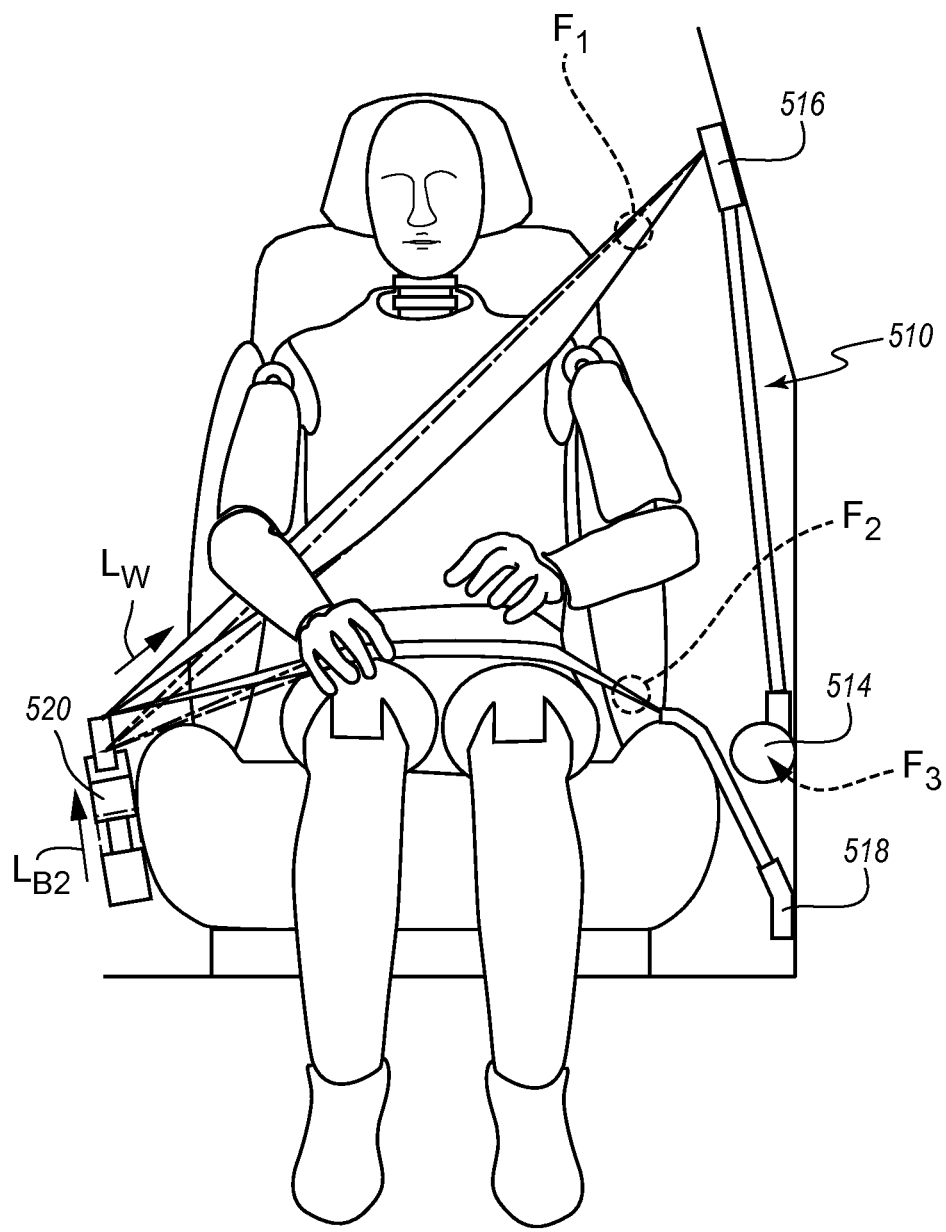
FIG. 5 a front view of an occupant on a seat that shows yet another seatbelt system.

FIG. 5 shows a buckle 520 that is configured to move a distance identified as $L_{B2}$. When buckle 520 moves, there is a web payout identified at $L_W$.

Other embodiments are also possible that provide for a web payout to alter the load of the seatbelt in a seatbelt system including those that do not provide a web payout through a mechanical release. For example, the webbing of the seatbelt may be a material capable of stretching when a certain load is reached. As an example of such an embodiment, the webbing may comprise a material that stretches with about 100% plastic deformation and about 0% elastic deformation and therefore have limited elastic induced occupant rebound from the restraint system. Such a belt system can moderate loads within the webbing, as described above, but the amount of elastic energy stored in the webbing would differ. In one embodiment, instead of just allowing the occupant to ride down with the airbag, the seatbelt may be spooled back to resume some load at the shoulder level.

Figure 6A:
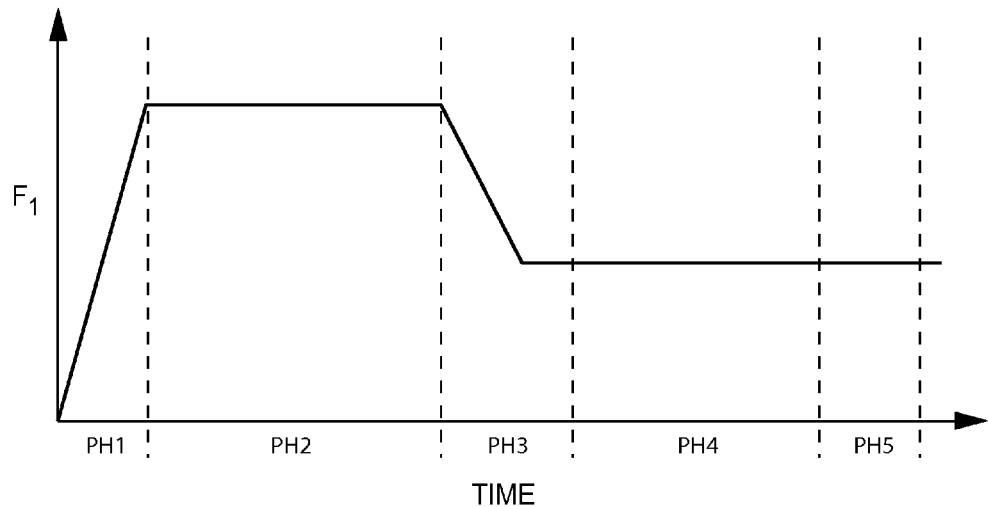
FIG. 6A is a graph that shows the load step down of a seatbelt system as measured at $F_1$.
Figure 6B:
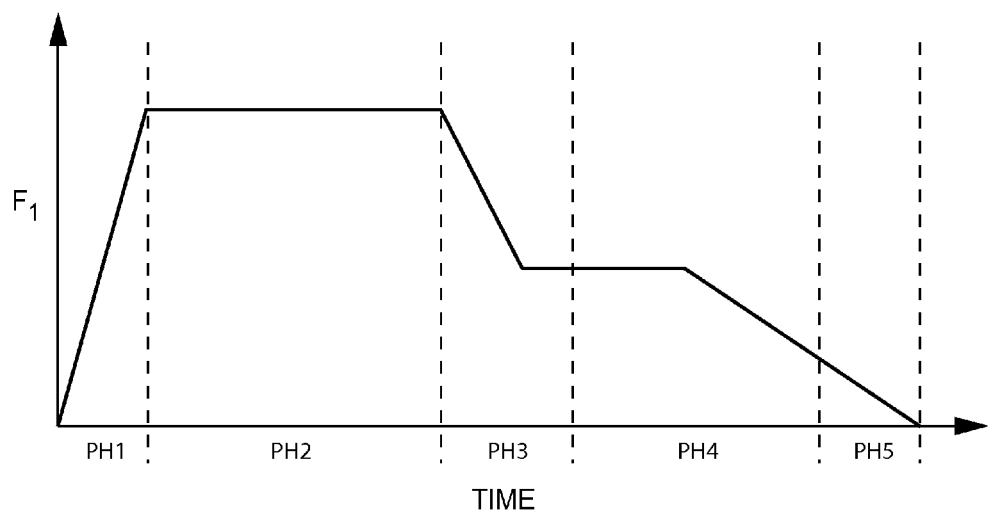
FIG. 6B is a graph that shows the load step down of another seatbelt system as measured at $F_1$.
Figure 6C:
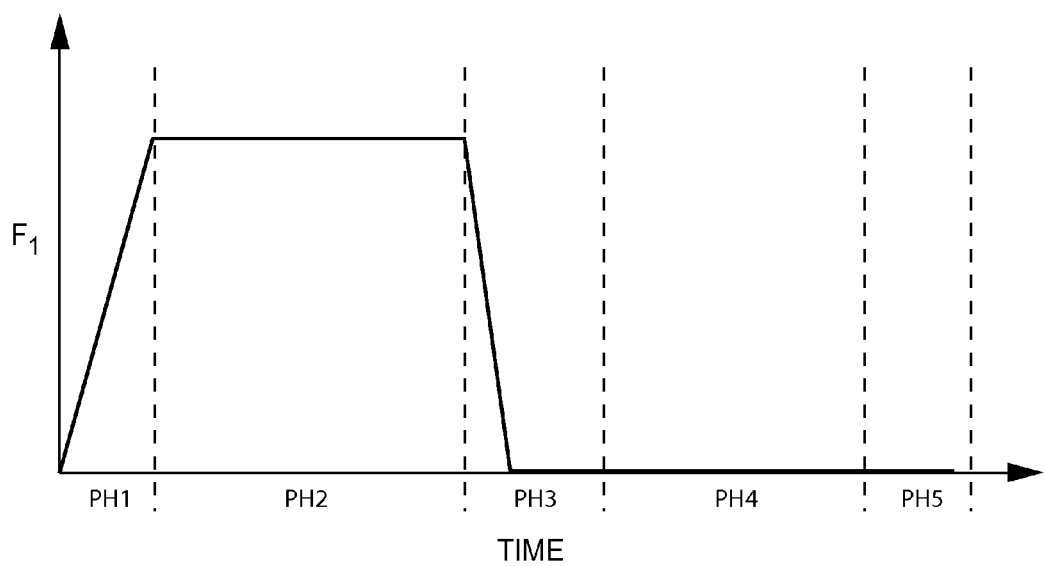
FIG. 6C is a graph that shows the load step down of an additional seatbelt system as measured at $F_1$.

These embodiments shown in FIGS. 1A-1E, FIG. 2, FIG. 3, FIG. 4 and FIG. 5 can be designed such that the load on the seatbelt is altered as shown in FIGS. 6A-6C, which are graphs that show the theoretical loading measured over time by a load cell positioned on the seatbelts at $F_1$ assuming a continuous load is applied to the seat belt system. More particularly, FIGS. 6A-6C show the possible loads of the embodiments of seatbelt systems shown in FIGS. 2-5 during the five phases described above with respect to FIGS. 1A-1E. Note, however, that the phases correspond primarily with the position of the occupant, particularly the occupant's neck, while the graphs show the load on the seatbelts. As shown in the graphs, the configurations of these embodiments provide for a significant digression or step down in the load that is measured during phase 3. FIG. 6A shows that the load drops significantly at the shoulder belt and does not return to its previous level as the airbag is relied upon for protecting the occupant and the occupant rides down with the airbag. FIGS. 6B-6C show loads when one of the seatbelt systems 210, 310, 410, and 510 are designed to operate like system 110' is shown operating in FIGS. 11A-11B, as described below. FIG. 6B shows that the seatbelt load again continues to drop as the occupant rides down with the airbag. FIG. 6C shows the load being completely reduced during phase 3 so that only the airbag is subsequently relied on to keep the passenger positioned as desired.

Figure 7A:
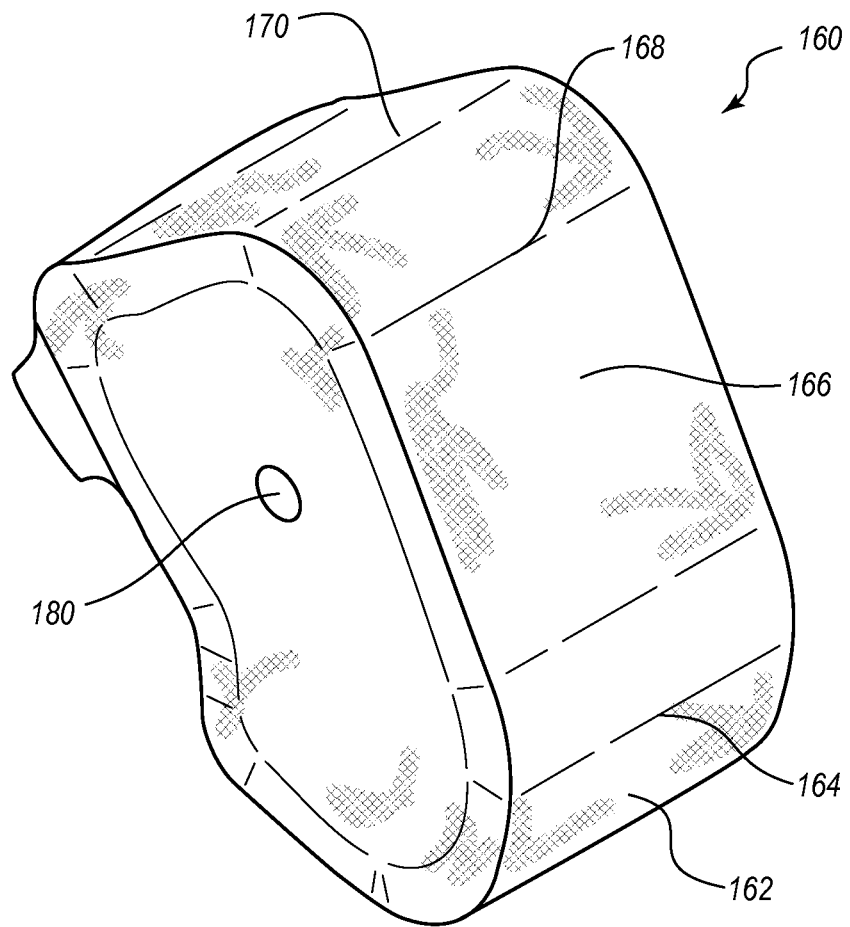
FIG. 7A is a perspective view of an airbag as shown in FIGS. 1A-1E.
Figure 7B:
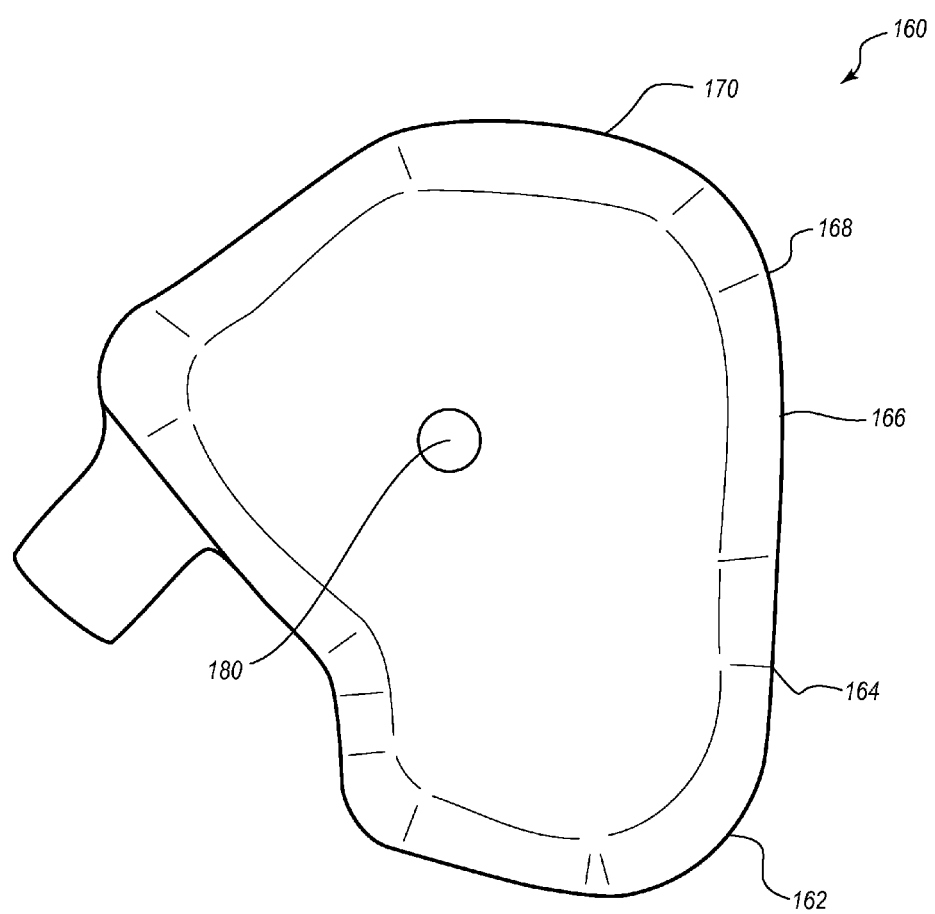
FIG. 7B is a side view of the airbag shown in FIG. 7A.

FIGS. 7A-7B respectively provide a perspective view and a side view of airbag 160. An airbag such as airbag 160 is generally a conventionally configured airbag that may be used with the seat belt systems described above. Airbag 160 has a lower portion 162 and a face 166. Face 166 has a bottom 164 and a top 168. Top 168 of face 166 transitions to a top portion 170. Airbag 160 may also have a fixed vent 180.

Figure 8:
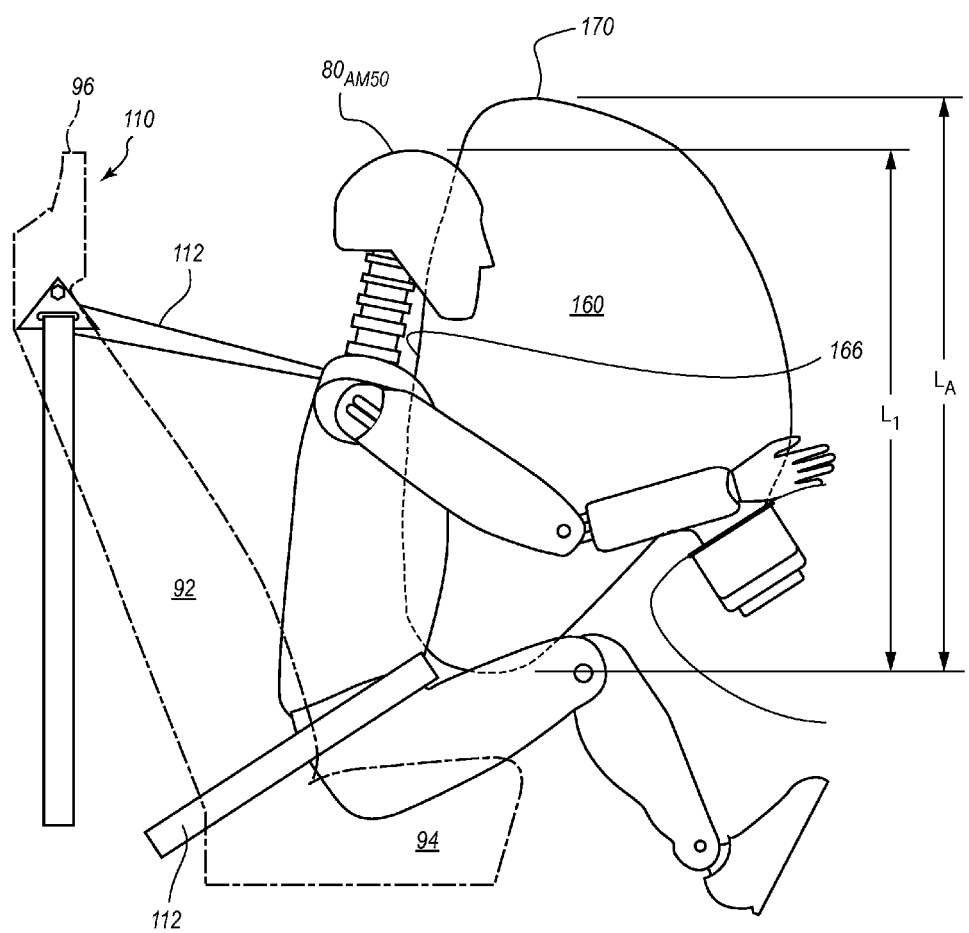
FIG. 8 is a side view of a dummy, a seat belt system and the airbag cushion depicted in FIGS. 7A-7B.

FIG. 8 is a side view of a dummy, a seat belt system and the airbag cushion depicted in FIGS. 7A-7B. FIG. 8 shows the dimensions of a dummy corresponding in size to AM50, which is a 50th percentile male dummy having a height of 175 cm (5' 9" ft) tall and a mass of 77 kg (170 lb), as identified at $80_{AM50}$. The lengths from the thighs of each dummy to the top of the head of each dummy are identified in FIG. 8 at $L_1$. The height of airbag cushion 160 as measured from the lowest point on bottom portion 162 to the highest point on top portion 170 is identified at $L_A$. Because $L_A$ is greater than $L_1$, top portion 170 extends over the occupant's head.

Figure 9:
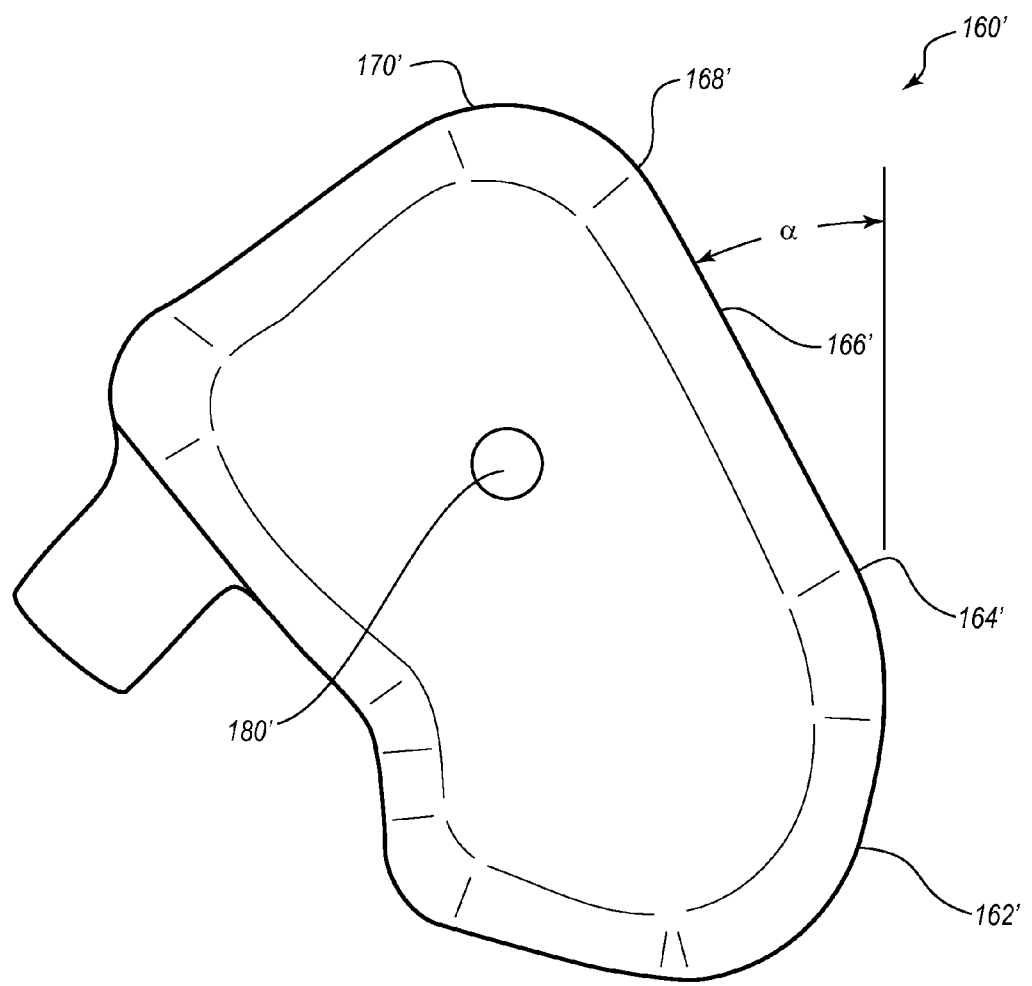
FIG. 9 is a side view of another embodiment of an airbag, which has a sloped impact face.

FIG. 9 provides a side view of another embodiment of an airbag 160' that may be used with the seat belt systems as described above. Face 166' is sloped as shown so that the face 166' is at an angle, identified as a. Angle a starts at bottom 164' of face 166' and extends upward to top 168' of face 166'. Top 168' then transitions to top portion 170'. Bottom portion 162' provides lower coverage for proper lower chest and abdominal restraint. The angle a may be any angle that matches the angle between the head and the torso as the head and torso are contacted by the airbag. For example, the angle a may be up to about 36°, between about 15° and about 36°, between about 20° and about 36°, between about 20° and about 30°. The angle may also be about 28°.

Figure 10:
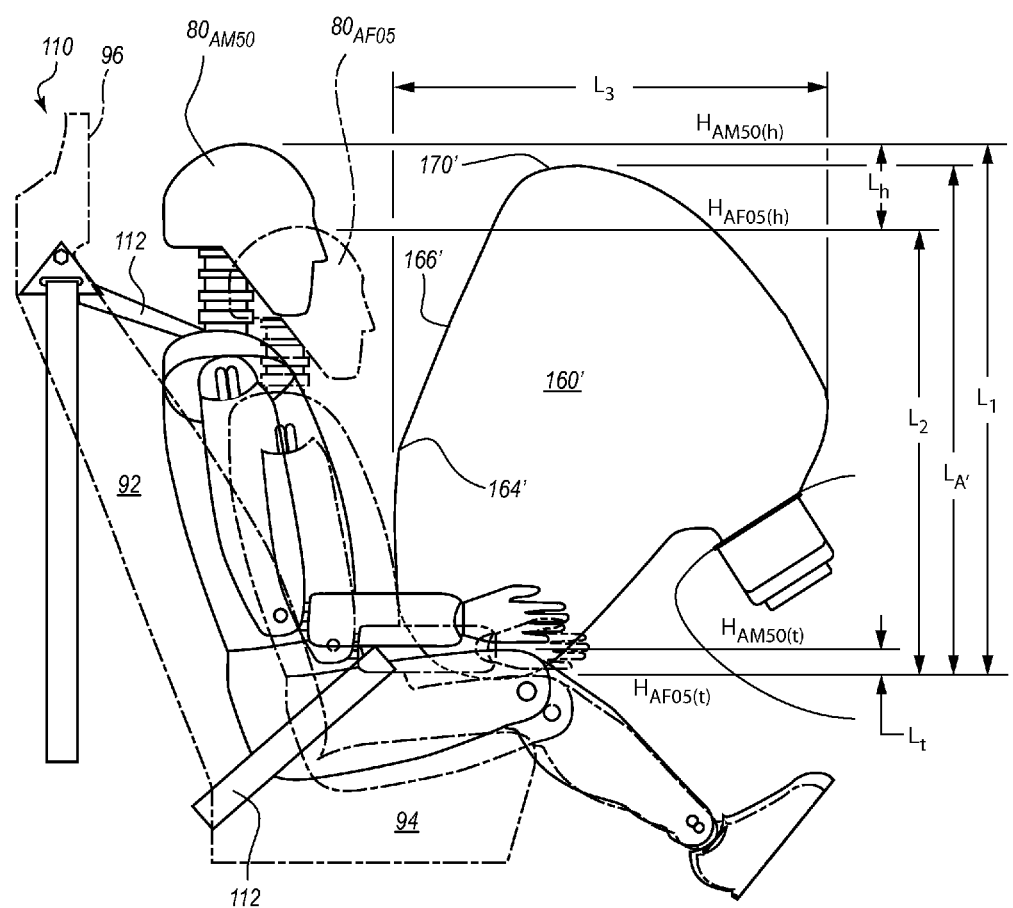
FIG. 10 is a side view of a dummy corresponding in size to AF05 and another dummy corresponding in size to AM50, a seat belt system and the airbag cushion depicted in FIG. 9.

As shown in FIG. 10, bottom 164' of face 166' corresponds with the location of an AF05 dummy's shoulder level. The dummy corresponding in size to AF05, which is a 5th percentile female dummy having a height of 152 cm (5 ft) tall and a mass of 50 kg (110 lb), is identified at $80_{AF05}$. FIG. 10 also shows the dimensions of a dummy corresponding in size to AM50, as identified at $80_{AM50}$. The lengths from the thighs of each dummy to the top of the head of each dummy are identified in FIG. 10 at $L_1$ and $L_2$ respectively for dummy $80_{AM50}$ and dummy $80_{AF05}$. The height of airbag cushion 160' as measured from the lowest point on bottom portion 162' to the highest point on top portion 170' is identified at $L_{A'}$. The height of airbag cushion 160' as measured from the bottom 164' of face 166' to the front of the airbag cushion is identified at $L_3$. In this embodiment, the length of the airbag cushion, $L_{A'}$, is less than the length, $L_1$.

FIG. 10 also shows that top portion 170', after full deployment of airbag cushion 160', extends to a height that is between the height of the top of the head of an AM50 dummy as shown by the line from the head of dummy at $80_{AM50}$ at $H_{AM50(h)}$ and the top of the head of an AF05 dummy as shown by the line from the head of dummy $80_{AF}05$ at $H_{AF05(h)}$, when each dummy is in a normal seated position. The difference between the height of the top of the dummys' heads is shown at $L_h$. Additionally, FIG. 10 shows that after full deployment of the airbag cushion 160', while either dummy is in a normal seated position, bottom portion 162' extends between the height of the top of the thigh of dummy $80_{AM50}$ and the top of the thigh of dummy $80_{AF05}$, which are respectively shown at $H_{AM50(t)}$ and at $H_{AF05(t)}$, as measured from each dummy's knee to the top of base 94. The difference between the height of the top of the thighs is shown at $L_t$.

FIG. 11A shows an occupant or dummy 80 during rebound induced loading, which is referred to herein as phase 3, after seat belt system 110' and airbag 160 have cooperated together to moderate the loads applied to the occupant when a certain amount of force is applied to belt 112. In contrast to the same phase with airbag cushion 160 as shown in FIG. 1C, the angle of sloped face 164' allows the occupant's head to move forward, as shown by direction arrow, $D_H$.

FIG. 11B shows an occupant 80 as airbag cushion 160' begins to deflate. Occupant 80 is shown riding the airbag down. As a result, the occupant's head and torso continue to move forward, as shown respectively by direction arrows, $D_H$ and $D_T$.

Figure 12:
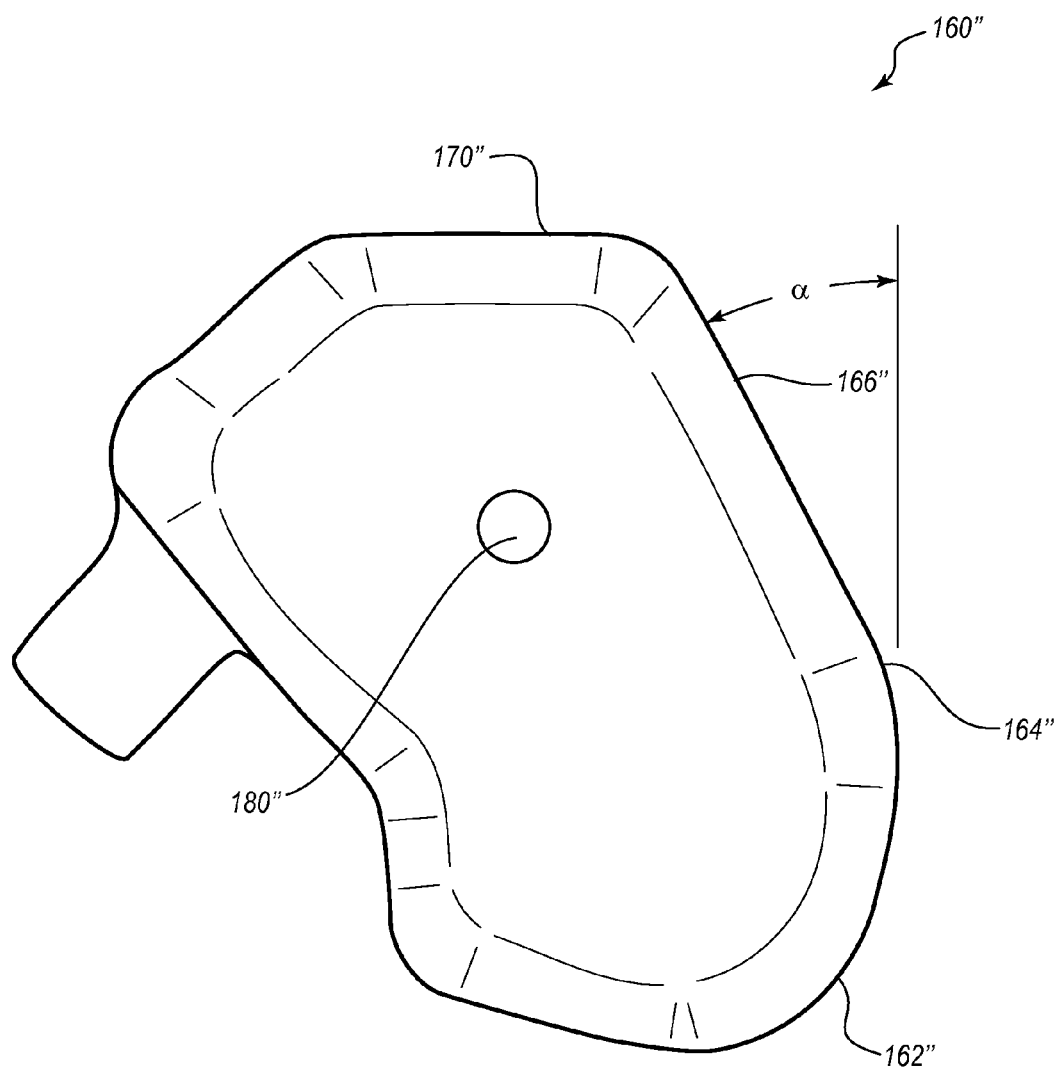
FIG. 12 is a side view of an airbag cushion featuring a sloped impact face and a flat top portion.

FIG. 12 is a side view of airbag 160", which has a sloped impact face 166" like sloped impact face 166'. Airbag 160" also has a top portion 170" that is sized and configured to prevent airbag cushion 160" from extending over an occupant's head. Top portion 170" is substantially flat, meaning that it is relatively parallel with a longitudinal axis of the vehicle. Top portion 170" also has a height, as described below, with respect to FIG. 13 that assists in preventing airbag cushion from extending over an occupant's head. Top portion 170" of the airbag is "flat" since the cushion depth at this point needs to be maintained while minimizing the ability of the airbag to extend over the occupant's head, particularly an AF05 dummy.

Figure 13:
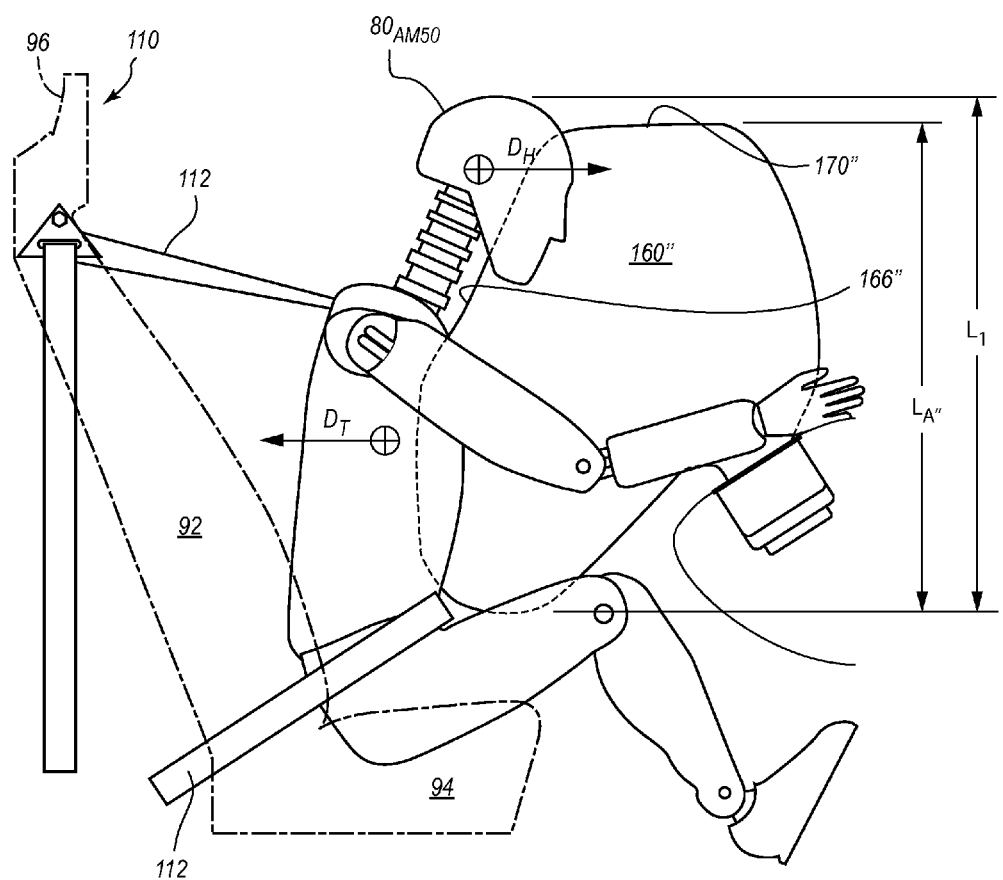
FIG. 13 is a side view of a dummy, a seat belt system and the airbag cushion depicted in FIG. 12.

FIG. 13 shows dummy $80_{AM50}$ after deployment of airbag 160" at a moment during an impact that is similar to the moments shown in FIG. 1C and FIG. 11A. Airbag 160" has a height as measured from the lowest point on bottom portion 162" to the highest point on top portion 170" as identified at $L_{A''}$ that is less than the length, as identified at $L_1$, from the dummy's thighs to the top of the dummy's head. Because $L_{A''}$ is less than $L_1$, top portion 170'' does not extend over the occupant's head. Note that $L_1$ is actually the length from the dummy's thighs to the top of the dummy's head as measured when the dummy is in a normal seated position against backrest 92 as shown in FIG. 10 and not in the position as shown in FIG. 13. While $L_{A'}$ in FIG. 10 and $L_{A''}$ in FIG. 13 are both less than $L_1$, the length of the airbag, $L_A$, may also be approximately equal to the length, $L_1$ such that length $L_A$ is not greater than the length $L_1$. In other embodiments, such as airbag 160, $L_A$ may be set such that it is only about 1 cm to about 3 cm greater than $L_1$. For such embodiments, length $L_A$ is not substantially greater than the length $L_1$.

FIG. 13 also shows that the neck of dummy $80_{AM50}$ is tipped forward in the flexion mode due to sloped face 166''. This configuration matches the angle of the head and neck of the occupant just prior to cushion loading so as to not change or affect the neck negatively during the crash event. Additionally, this configuration allows the head to follow a natural ride-down trajectory.

EXAMPLE

Testing was conducted to identify the load some of a particular system under certain conditions. The results of this testing are reported in Example 1. The following specific example is included for illustrative purposes only and is not to be considered as limiting to this disclosure.

Example 1

Figure 14:
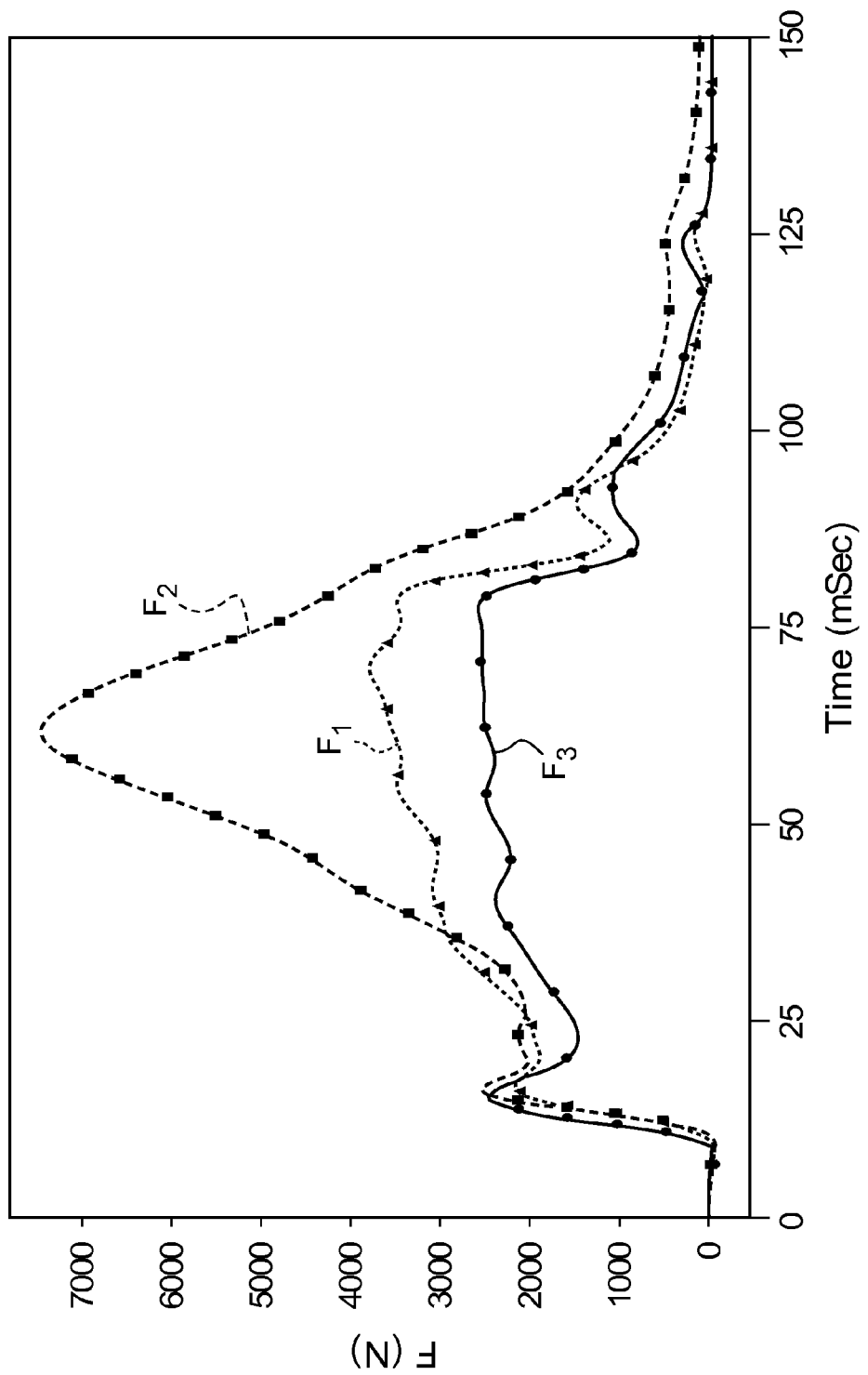
FIG. 14 is chart showing test data of a system as shown in FIG. 2.

A system configured like the system as shown in FIG. 2 was tested with a vehicle moving at 35 miles per hour upon impact. Loads were measured at the shoulder portion of belt 212, as indicated at $F_1$; at the lap portion of belt 212, as indicated at $F_2$; and at retractor 214, as indicated at $F_3$. The results of the data are in the chart provided as FIG. 14.

As indicated above, the five phases described above with respect to FIGS. 1A-1E correspond primarily with the position of the occupant, particularly the occupant's neck. While the table reports the loads, the five phases can also be referenced with respect to the timing identified in the table. During phase 1 the seatbelt interacts with the dummy until the airbag contacts the dummy. The transition from phase 1 to phase 2 occurs during about 25-30 milliseconds after the impact is sensed and causes the moment of the neck to move from a negative moment to a positive moment. The transition from phase 2 to phase 3 occurs during about 80 milliseconds after the impact is sensed and generally corresponds with maximum forward displacement of the occupant's chest. The transition from phase 3 to phase 4 occurs about 120 milliseconds after the impact is sensed and generally corresponds with a transition of the neck from negative moment to a positive moment. The transition from phase 4 to phase 5 corresponds with the occupant's torso impacting the seatback.

The load sensor at the lap portion of the seatbelt, as shown at $F_2$, does not reflect a significant change during the transition from phase 3 to phase 4. However, the load sensor at the retractor and at the shoulder portion of the seatbelt as respectively shown at $F_1$ and $F_3$ show significant digression as the loads are moderated.

It will be understood by those having skill in the art that changes may be made to the details of the above-described embodiments without departing from the underlying principles presented herein. For example, any suitable combination of various embodiments, or the features thereof, is contemplated.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein.

The claims following this Detailed Description are hereby expressly incorporated into this Detailed Description, with each claim standing on its own as a separate embodiment. This disclosure includes all permutations of the independent claims with their dependent claims. Recitation in the claims of the term "first" with respect to a feature or element does not necessarily imply the existence of a second or additional such feature or element. Elements specifically recited in means-plus-function format, if any, are intended to be construed in accordance with 35 U.S.C. §112 ¶ 6. Embodiments of the invention in which an exclusive property or privilege is claimed are defined as follows.

The invention claimed is:
1. An airbag comprising:
   a bottom portion that extends between a first side and a second side, wherein the first side comprises an outwardly directed face at an outer surface of the airbag that is configured to extend transversely from the bottom portion when the airbag is deployed;
   a top portion that extends between the first side and the second side, wherein the outwardly directed face at the first side of the airbag is configured to extend transversely from the top portion when the airbag is deployed; and
   an impact face between the bottom portion and the top portion, wherein the outwardly directed face at the first side of the airbag is configured to extend transversely from the impact face when the airbag is deployed, and wherein the impact face is configured to be directed toward a head of an occupant of a vehicle when the airbag is deployed within the vehicle,
   wherein the impact face has a bottom that is adjacent to the bottom portion and a top that is adjacent to the top portion, and
   wherein the impact face is sloped such that, when the airbag is deployed within a vehicle, a tangent taken from the bottom of the impact face upward defines an angle relative to a line that is vertically oriented relative to the vehicle, and wherein the angle is within a range of from about 15° to about 36°.

2. The airbag of claim 1, wherein the impact face extends from the first side of the airbag to the second side of the airbag and is substantially flat between the first and second sides of the airbag.

3. The airbag of claim 1, wherein the outwardly directed face at the first side of the airbag is oriented vertically when the airbag is deployed within a vehicle.

4. The airbag of claim 1, wherein the angle is between about 20° and about 30°.

5. The airbag of claim 1, wherein the angle is about 28°.

6. An airbag comprising:
a bottom portion that is configured to restrain movement of an abdomen of an occupant of a vehicle when the airbag is deployed within the vehicle;
a top portion; and
an impact face between the bottom portion and the top portion, wherein the impact face is configured to be directed toward a head of an occupant of a vehicle when the airbag is deployed within the vehicle,
wherein the impact face has a bottom that is adjacent to the bottom portion and a top that is adjacent to the top portion,
wherein, the airbag is configured such that when the airbag is deployed within a vehicle, a length of the airbag cushion extending between a lowest point of the bottom portion and a highest point of the top portion is not greater than a length from thighs of an AM50 dummy to a top of a head of an AM50 dummy either by a substantial amount or by any amount, when the dummy is positioned within the vehicle in a normal seated position, and
wherein an entirety of a portion of the airbag that is configured to face toward an occupant of a vehicle when the airbag is deployed within a vehicle is devoid of any concavities that extend inwardly toward an interior of the airbag.

7. The airbag of claim 6, wherein the top portion of the airbag cushion is substantially flat such that it is substantially parallel with a longitudinal axis of the vehicle.

8. The airbag of claim 6, wherein the length of the airbag cushion extending between the lowest point of the bottom portion and the highest point of the top portion is no greater than the length from the thighs of the AM50 dummy to the top of the head of the AM50 dummy when the dummy is in the normal seated position.

9. The airbag of claim 6, wherein the length of the airbag cushion extending between the lowest point of the bottom portion and the highest point of the top portion is less than the length from the thighs of the AM50 dummy to the top of the head of the AM50 dummy when the dummy is in the normal seated position.

10. An airbag comprising:
a bottom portion that is configured to restrain a lower chest and an abdomen of an occupant of a vehicle when the airbag is deployed within the vehicle;
a top portion; and
an impact face between the bottom portion and the top portion, wherein the impact face is configured to be directed toward and receive a head of an occupant of a vehicle when the airbag is deployed within the vehicle during a crash event,
wherein the impact face has a bottom that is adjacent to the bottom portion and a top that is adjacent to the top portion, and
wherein the impact face is substantially flat and is sloped relative to the bottom portion and the top portion of the airbag, wherein, when the airbag is deployed within a vehicle, a tangent extending along the impact face from the bottom of the impact face upward to the top of the impact face defines a single angle relative to a line that is vertically oriented relative to the vehicle, and wherein the angle is within a range of from about 15° to about 36°.

11. The airbag of claim 10, wherein the top portion of the airbag cushion is substantially flat and is substantially parallel with a longitudinal axis of the vehicle.

12. The airbag of claim 10, wherein the impact face extends transversely from an outer side surface of the airbag.

13. The airbag of claim 10, wherein the impact face is devoid of any concavities that extend inwardly toward an interior of the airbag when the airbag is deployed.

14. The airbag of claim 10, wherein the angle is between about 20° and about 30°.

15. The airbag of claim 10, wherein the airbag is configured such that when the airbag is deployed within a vehicle, a length of the airbag cushion extending between a lowest point of the bottom portion and a highest point of the top portion is not greater than a length from thighs of an AM50 dummy to a top of a head of an AM50 dummy either by a substantial amount or by any amount, when the dummy is positioned within the vehicle in a normal seated position.

16. The airbag of claim 15, wherein the length of the airbag cushion extending between the lowest point of the bottom portion and the highest point of the top portion is no greater than the length from the thighs of the AM50 dummy to the top of the head of the AM50 dummy when the dummy is in the normal seated position.

17. The airbag of claim 15, wherein the length of the airbag cushion extending between the lowest point of the bottom portion and the highest point of the top portion is less than the length from the thighs of the AM50 dummy to the top of the head of the AM50 dummy when the dummy is in the normal seated position.

18. An airbag comprising:
a bottom portion that is configured to restrain a lower chest and an abdomen of an occupant of a vehicle when the airbag is deployed within the vehicle;
a top portion; and
an impact face between the bottom portion and the top portion, wherein the impact face is configured to be directed toward and receive a head of an occupant of a vehicle and is sloped relative to the bottom portion, and
wherein the top portion is configured to extend to a height within a vehicle, after full deployment of the airbag within the vehicle, that is between a height to which a top of a head of an AM50 dummy extends within the vehicle and a height to which a top of a head of an AF05 dummy extends within the vehicle when each dummy is separately positioned within the vehicle in a normal seated position.

19. The airbag of claim 18, wherein the impact face is sloped such that a tangent taken from the bottom of the impact face upward defines an angle within a range of from about 15° to about 36° when the airbag is deployed within the vehicle.

20. The airbag of claim 19, wherein the impact face is devoid of any concavities that extend inwardly toward an interior of the airbag when the airbag is deployed.

21. The airbag of claim 18, wherein, after full deployment of the airbag within a vehicle, the bottom portion extends downwardly to a height that would be between the height of the top of the thigh of an AM50 dummy and the top of the thigh of an AF05 dummy as measured from the dummy's knee when each dummy is in the normal seated position.

* * * * *